United States Patent [19]

Brandle et al.

[11] Patent Number: 5,146,593

[45] Date of Patent: Sep. 8, 1992

[54] PROCEDURE CALL INTERFACE

[75] Inventors: Richard T. Brandle, Marietta; Don L. Goodliffe, Dunwoody; Donald E. Keith, Peachtree City; Randy A. Robinette; Robert C. Sizemore, both of Acworth; Garry J. Smithwick, Alpharetta; Anthony J. Zappavigna, Marietta, all of Ga.

[73] Assignee: International Business Machines Corporation, Armonk, N.Y.

[21] Appl. No.: 320,086

[22] Filed: Mar. 6, 1989

[51] Int. Cl.$^5$ ............................................. G06F 12/04
[52] U.S. Cl. .................................. 395/700; 364/DIG. 1;
364/280.4
[58] Field of Search .......................... 364/200; 395/700

[56] References Cited

U.S. PATENT DOCUMENTS

| 4,205,371 | 5/1980 | Feather ..................... 364/DIG. 1 |
| 4,455,604 | 6/1984 | Ahlstrom et al. ............ 364/DIG. 1 |
| 4,712,189 | 12/1987 | Mohri ........................ 364/DIG. 2 |

Primary Examiner—Thomas M. Heckler
Attorney, Agent, or Firm—Kenneth C. Hill

[57] ABSTRACT

A system software interface is provided which is called by applications programs using a standard format. All calls to system library routines are made through this interface. When called, the interface determines the location and original language of a desired library procedure. The interface then sets up parameters and calls such procedure using the calling convention which it expects. The interface receives any results generated by the library procedure, converts them to the return convention used by the calling application, and returns the results to the calling application.

10 Claims, 2 Drawing Sheets

PROCEDURE CALL INTERFACE

BACKGROUND OF THE INVENTION

1. Technical Field

The present invention relates generally to computer systems, and more specifically to techniques for making procedure calls.

2. Background Art

Programming languages provide facilities for making procedure calls, whereby code which is reusable can be placed in a defined location and executed when needed. Parameters can be passed to called procedures, and results returned. As used herein, the term procedure will be used in a generic sense; program segments which are referred to in particular instances as procedures, functions, and subroutines will all be referred to herein as procedures.

Details of procedure calling conventions differ with different programming languages. Some parameters may be passed in registers, on a procedure stack, or in memory blocks pointed to by pointers held in a register or a stack location. Because of different calling conventions used by different languages, procedure calls must be made to procedures originally written in the same language, or another language using the same calling conventions. If it is desired to make a call to a procedure originally written in a different language, and the identity of the original language is known, special steps can sometimes be taken to restructure the call to function correctly with such procedure. This restructuring usually requires modification of the call at the assembly language level.

In many computer systems, including virtually all large and medium size systems, common libraries of procedures are maintained for standard and often used functions. These procedures are called from application programs, freeing an applications programmer from writing and debugging code to perform common functions. Depending on the system design, library functions can be linked to an application program at link time, or they may be dynamically linked at execution time if this is supported by the operating system.

The language calling convention problem described above exists with the use of procedure libraries. A library procedure must typically be written in each language supported by the system, so that multiple procedures exist for performing the same library function An alternative is to have one or a limited number of procedures written in a particular language, and require applications programmers to perform whatever steps are necessary in order to call procedures written in different languages.

Requiring that a system maintain multiple procedures, written in different languages, for performing a single common function is inefficient. Forcing applications programmers to undertake steps necessary to call a procedure which uses a different calling convention is not always possible, and is clearly undesirable even where possible.

It would therefore be desirable for a system to provide the ability for applications programs to call library procedures without regard to the calling conventions used by the language the procedures were originally written in. It would also be desirable for such a system to provide the ability to change library procedures, including changing the language they are written in, without adversely affecting any applications program which might call such procedure.

SUMMARY OF THE INVENTION

It is therefore an object of the present invention to provide a computer system interface which allows programs to call common library procedures without regard to calling conventions used by the language in which such procedures were originally written.

It is also an object of the present invention to provide such a system interface which allows changes to be made to library routines without adversely affecting applications programs which call such procedures.

It is a further object of the present invention to allow a single library procedure to be used on a system for each desired function, and to allow such procedures to be rewritten in any language without regard to any differences which may exist in procedure calling conventions.

Therefore, according to the present invention, a system software interface is provided which is called by applications programs using a standard format. All calls to system library routines are made through this interface. When called, the interface determines the location and calling convention used by a desired library procedure. The interface then sets up parameters and calls such procedure using the calling convention which it expects. The interface receives any results generated by the library procedure, converts them to the return convention used by the calling application, and returns the results to the calling application.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The software system described herein is suitable for use with nearly any general purpose digital computer. Mainframes, minicomputers, engineering workstations, and many desktop personal computers can support the system described below. Only minor modifications, within the ability of those skilled in the art, are needed for various existing language compilers as will be described below.

Figure 1:
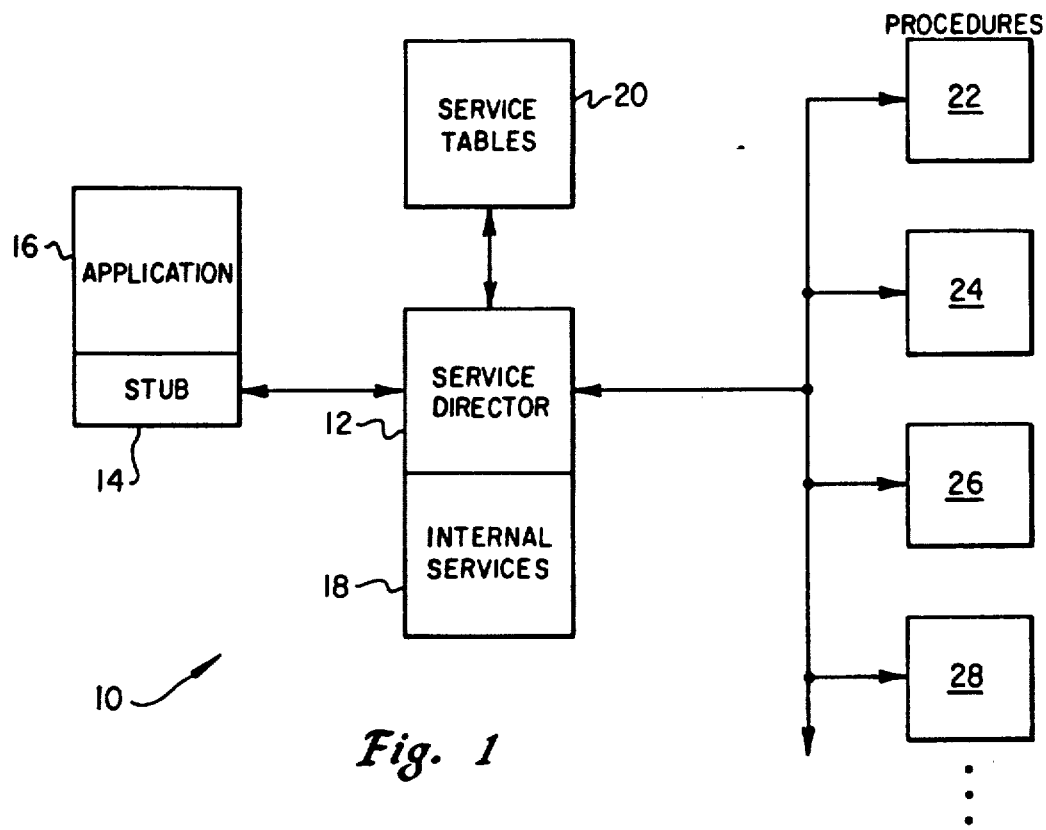
FIG. 1 is a block diagram of a system for calling library procedures according to the present invention.

Referring to FIG. 1, a system 10 for handling library procedure calls includes a service director 12. The service director 12 is a software procedure which is called by a stub procedure 14. The stub procedure 14 is part of an application program 16.

The service director 12 contains several procedures which define internal services 18. The service director 12 also has access to data structures which define service tables 20. While executing, the service director 12 can make procedure calls to library procedures 22, 24, 26, and 28.

The application program 16 can perform any end use or system function, and is typically written in a high level language such as C or COBOL. Decreasingly, the application 16 may be written in assembly language. The stub procedure 14 is a small procedure which is linked to the application 16 at link time.

The stub procedure 14 is called in the manner of any other procedure by the application 16. Parameters passed to the stub procedure 14 describe a system library procedure, or service, whose execution is desired. The stub procedure 14 uses these parameters to make a procedure call to the service director 12.

Since different programming languages use different procedure calling conventions, a different stub procedure 14 must be provided by the system for each programming language supported. However, a single stub program 14 makes all calls to the service director 12 for all desired library services.

The service director 12 is the interface used by application programs 16 when library procedures are called. The service director 12, when called, examines the parameters passed to it and determines which library procedure is to be invoked. Certain procedures are preferably included directly in the code of the service director 12. These procedures can be referred to as internal services 18, or environmental services. These procedures 18 are typically those which are executed often, and are not of great complexity. Efficient calls to these procedures 18 are preferred in order to prevent system performance degradation. Typical system services which can be included as internal services 18 to the service director 12 include program and storage management, time of day and similar systems services, and initialization and control routines directed toward operation of the service director 12 itself.

When an application 16, through the stub 14, calls the service director 12, a procedure to be performed is identified by parameters passed thereto. Once the desired procedure is identified, the service director must determine where the procedure is stored in the system, what parameters it requires, and the language the procedure was originally written in. This last item indicates the procedure calling convention which must be used when the desired library procedure is invoked. The service director 12 finds this information from the service tables 20. The service tables 20 are data structures which provide a mapping from the names of system library procedures to the information just described, and can be implemented in any of several well known data structures.

Once the service director 12 has identified the library procedure to be invoked, it arranges any parameters to be passed thereto appropriately for the calling convention expected by the procedure, and then calls it. Any results returned by the procedure are passed to the service director 12. If necessary, the service director 12 reformats the results, and returns them to the stub procedure 14.

In many instances, an application program 16 and a called library procedure will be written in the same language, so that little difficulty is encountered in making the required procedure calls. In other cases, an implementation of one language may pass parameters and return results in registers, while an implementation of another language could use a stack. The service director 12 "knows" what is necessary to translate between one calling convention and another, and makes these changes in a fairly straight forward manner. For example, data and pointers can be moved from registers to a stack, and vice versa In a preferred embodiment, an application must make an initialization call to the service director 12 prior to invoking any system library procedures. This call passes parameters which identify the application, and allow the service director 12 to locate the appropriate service tables 20. Different applications may use different sets of service tables. This call can also provide a pointer to a common control block who's function will be described in connection with FIG. 2.

It is also preferable for the application 16 to make a termination call to the service director 12 after all calls to library procedures are completed. This allows the service director 12 to free allocated areas of memory, and generally clean up after the application 16.

Figure 2:
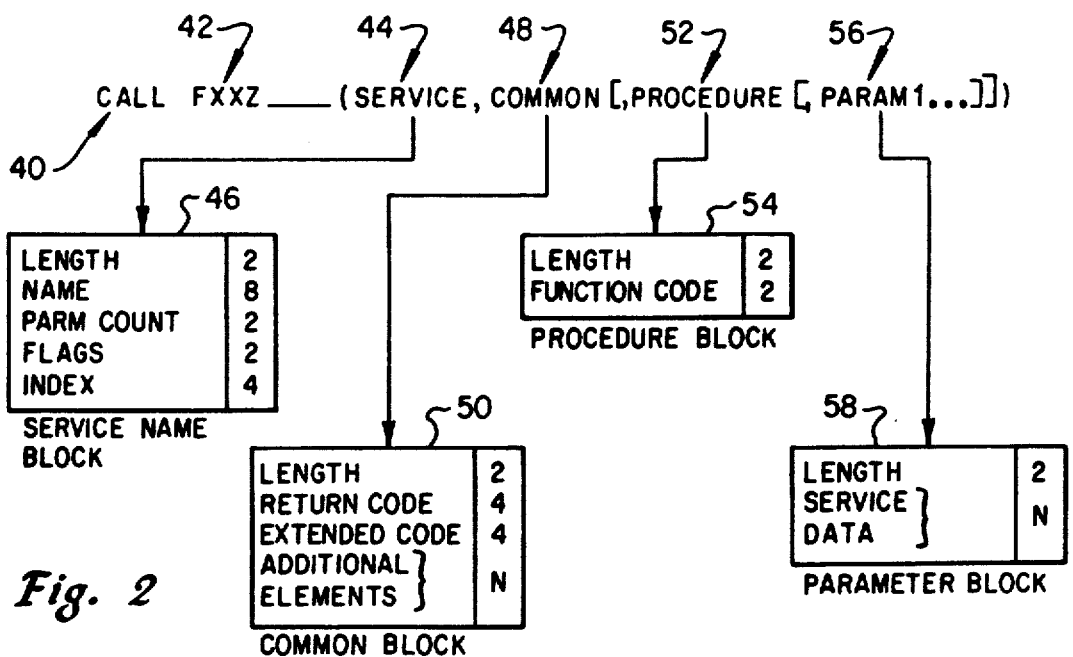
FIG. 2 is a diagram illustrating a format for calling library routines.

FIG. 2 illustrates a typical command for use within the application 16 for invoking a library procedure. A command line 40 is a call to a stub procedure 14 having a stub procedure name 42. In some languages, such as FORTRAN, the word CALL actually appears as part of the statement invoking the stub procedure 14. In many other languages, the work CALL is not used, and the stub procedure 14 is invoked merely by using its name 42.

The stub procedure name 42 is preferably relatively arbitrary, so that it tends to not conflict with the use of descriptive procedure names. In order that a system linker will be able to link in the stub 14 appropriate to the language of the application program 16, the stub procedure name 42 indicates which language is being used. In FIG. 2, a _ is shown, and this _ is preferably replaced by one or more characters indicating the language being used. For example, these characters could be "C", "CBL" (for COBOL), or "ASM" (for assembly language). In the alternative, the same stub procedure name is used for all languages, and each compiler identifies the appropriate stub procedure 14 by placing the necessary external linkage information in the object file it creates when it compiles the application program 16.

The first parameter passed to the stub procedure 14 is a service parameter 44, which is a pointer to a data structure called a service name block 46. The second parameter to be passed is a common block identifier 48, which contains a pointer to a common block 50. The third parameter 52 is a pointer to a procedure block 54, and additional parameters 56 are each pointers to separate parameter blocks 58.

The parameters 52 and 56, shown in square brackets, are optional in some cases. That is, some internal service calls, such as time of day, may require only the parameters 44 and 48, depending upon implementation.

The service parameter 44 points to the service name block 46, which is an allocated block of memory containing several different items of information. The numbers shown in block 46 indicate a number of bytes which that field occupies. In the preferred embodiment, the first field in the service name block 46 is a LENGTH field, which indicates the total number of bytes in the service name block 46. The next field is a NAME field, which is the name of a service. A PARM COUNT field indicates the number of parameters which are to be passed to the called service. This count is used to determine whether a procedure parameter 52 is being passed, and how many parameter items 56 are being passed.

A FLAGS field is used to pass information from the stub procedure 14 to the service director 12. One type of information typically passed is the identity of the calling language. All of the stub procedures 14 for different languages call the service director 12 at the same entry point, and the FLAGS field in the service name block indicates to the service director 12 which calling convention is being used.

The INDEX field is used to more quickly identify the location of information about a particular service. The first time a service is invoked, the service director 12 must search through the service tables 20 in order to match the NAME field with the various names available in the tables 20. Once this match has been made, the service director 12 places the address of that entry in the tables 20 into the INDEX field. Whenever various functions of this service are called in the future, this address is used to access the appropriate entry in the service tables 20 directly.

The common block 50 is used by the service director 12 to return status and other information to the application program 16. A LENGTH field indicates the size of the common block 50. A RETURN CODE field is used to return status codes to the application program 16. By convention in a preferred embodiment, a positive value for the return code simply passes through any return code generated by the called library procedure. Also by convention, a negative value for a return code is used by the service director 12 to indicate a failure within its area of responsibility. Such failures could includes, for example, the inability to locate a desired library procedure. The EXTENDED CODE field provides an additional ability to return error codes.

The ADDITIONAL ELEMENTS fields are optional, and may be used to transfer data or pointers to data back to the application program 16.

In addition to the LENGTH field, the procedure block 54 includes a FUNCTION CODE field. This field is a number indicating which function of a service is desired.

In a preferred embodiment, it is anticipated that related functions will be grouped together, and this grouping is called the service. In order to access one of these procedures, a name applied to the service as a whole is required, and is found in the service name block 46, and an indication of which procedure within the service is requested is found in the procedure block 54. For example, a group of routines for performing matrix manipulation can be identified by a single service, with the procedure block 54 indicating whether calculation of a determinant, matrix multiplication, inversion, or other matrix manipulations are requested.

Each parameter block 58 is used to transmit one parameter to the requested library procedure. The SERVICE DATA field in the parameter block 58 can contain the data directly, or can contain a pointer to the data. The type of data contained in each parameter block 58 is dependent upon what each individual library procedure expects, and will be specified in the documentation for that particular library procedure.

Figure 3:
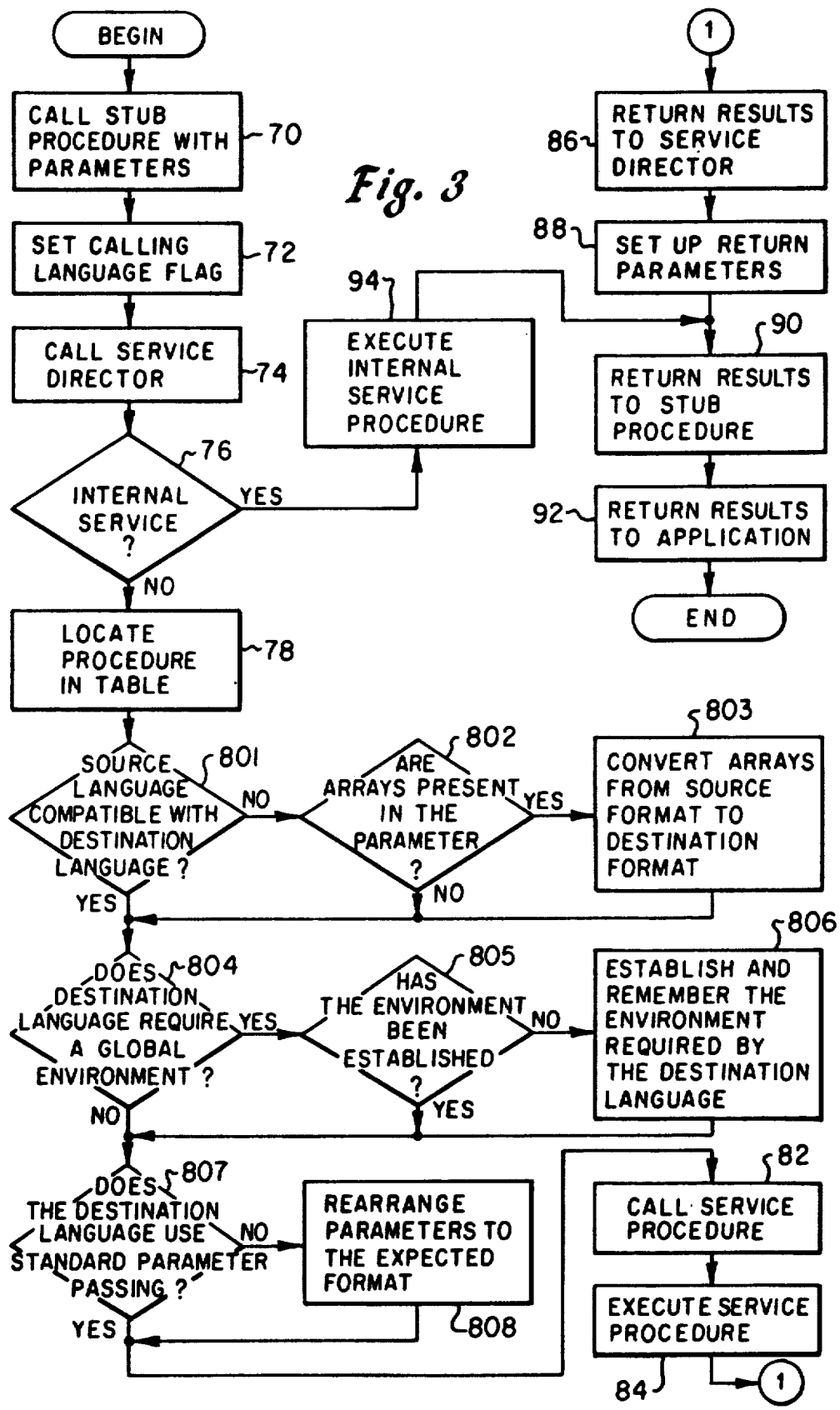
FIG. 3 is a flowchart illustrating steps taken to call a library procedure.

FIG. 3 illustrates the steps which occur during a call of a library procedure by an application program 16. The flowchart of FIG. 3 assumes that any initialization calls which need to be made to the service director 12 have already been made. FIG. 3 illustrates only the sequence of events which occur during a single call to a library procedure.

First, the application program 16 calls the stub procedure and passes parameters to it 70. These parameters, as described in connection with FIG. 2, preferably identify at least a service and common block, and optionally a procedure identifier and parameters if required. The stub procedure then sets a calling language flag 72. This flag indicates to the service director 12 the programming language of the application program 16, thereby indicating which calling conventions are used by the application 16 and stub procedure 14.

The stub procedure then calls the service director 74, which determines if the request is for an internal service 76. If the requested procedure is not internal to the service director 12, the service director 12 locates the desired procedure in the service table 78. As described above, the service table entry indicates that information necessary for the service director 12 to properly call the requested library procedure.

The service director 12 then sets up the parameters to call the library procedure. A call to a library procedure requires conversion of parameters from the format used in the language of the application program 16 to one of the formats used by the languages of the service procedure 22-28. A conversion procedure (steps 801-808) provided by the service director 12 is a generalization of techniques known in the art for calling a procedure written in a known, but different language than that of an application program. See for example the "IBM C/370 Users Guide", Chapters 31-36, Document No. SC 091264-03 available from the International Business Machines Corporation, "OS PL/I Version 2 Programming Guide", Chapter 17-20, Document No. SC 264307-01 available from the International Business Machines Corporation, or "VS COBOL II Application Programming Guide", part 2, page 142, Document No. SC 264045-03, available from the International Business Machines Corporation.

Three types of operation are considered: (1) conversion of parameter arrays between column major order and row major order; (2) establishment of a global environment; or (3) rearrangement of parameters between call by value and call by reference. Need for each of the basic types of operations are determined at steps 801-802, 804 and 807. At steps 801 and 802 it is determined if noncompatible arrays are present in the source language of the application program and the destination language of the procedure. If yes, the arrays are converted from the source language format to the destination language format (step 803). An example of such a conversion would be that between column major order and row major order. From step 801 (YES branch), step 802 (No branch), or step 803, step 804 is next executed. A destination language may require establishment of a so-called global environment. If a global area is required (step 804) and has not been previously established (step 805) it is established at step 806. From the NO branch of step 804, the YES branch of step 805, or step 806, step 807 is next executed. Certain languages have standard formats for passing parameters between programs written in the languages. If this is not available (step 807) parameters are rearranged to a new format for the destination language, (step 808). An example of a difference allowed for between the languages is "call by value" and "call by reference." Once the forgoing operations are completed, service direction 12 is ready to call the appropriate service procedure 22-28 and calls it 82. The service procedure executes in its normal manner 84, and returns any generated results to the service director 86.

The service director 12 sets up its return parameters 88 to match the calling convention of the application program 16 as indicated by the flag set in step 72. The results are then returned to the stub procedure 90, which in turn returns them to the application program 92.

In step 76, if the service director 12 detects that an internal service is requested, it executes such internal procedure 94 and goes to step 90. The service director 12 understands the parameter passing mechanism used by the application program 16 because of the calling language flag set in step 72, and can handle any required translation directly.

The system and method described above allows system library procedures to be written in different programming languages. If a particular programming language is most appropriate for writing a particular desired library procedure, that language can be used. Only a single library procedure need be maintained to perform a given function, allowing for greatly improved maintainability of system library procedures. If particular procedures are added or deleted, or some procedure rewritten in a language using a different calling convention, such updated information is simply reflected in the service tables. This means the service director itself need not be modified, with the only modification necessary for a change in a library procedure being an update to the service tables. This change is easily made by updating the service tables directly through the use of a program which performs table updating.

Since the library procedures are dynamically linked, application program executables remain small. In addition, applications always invoke the current version of a library procedure, since links to particular procedures are not maintained directly in the application programs. The service director is located in a known location within the system, and is available to all applications which need to make service calls. Therefore, changes can also be made to the service director without affecting any application programs.

The only restrictions imposed on operation of the library procedures are the typical ones needed to ensure system and data integrity. The library procedures can be simple blocks of commonly used code, such as floating point libraries or database servers, or they can be more complex functions. Library procedures can perform input and output, and interface directly with a user for the application program. The library procedures can invoke other library procedures, or other programs or systems. Invocation of other library procedures can be made directly or through the service director as does an application program. Library procedures can also be used to manipulate hardware directly, such as for purposes of real time data collection and control.

While the invention has been particularly shown and described with reference to a preferred embodiment, it will be understood by those skilled in the art that various changes in form and detail may be made therein without departing from the spirit and scope of the invention.

We claim:

1. A digital computer system for processing procedure calls from an application program written in a first programming language to any selected one of a plurality of procedures, at least a first of which procedures is written in a second programming language, wherein the first programming language utilizes a first calling convention and the second programming language utilizes a second calling convention, the digital computer system comprising:

a data structure defining a map for converting between an expression of parameters in conformance with the first calling convention and an expression of parameters in conformance with the second calling convention;

means for generating a procedure call in the application program, the procedure call having an expression of parameters and an identification of the second programming language; and means responsive to the procedure call for accessing the data structure, for converting the expression of parameters from the procedure call into a reexpression of the parameters in conformance with the second calling convention and for generating a procedure call including the reexpression of the parameters to the selected procedure written in the second programming language.

2. A digital computer system for processing procedure calls as set forth in claim 1:

wherein the selected procedure returns a result to said procedure call responsive means, and wherein said procedure call responsive means is responsive to the result for accessing the data structure and converting result parameters to the first calling convention of the application program.

3. The system of claim 2, further comprising:

a plurality of application programs, each including means for calling said procedure call responsive means and for passing a procedure identifier and parameters thereto.

4. The system of claim 3, wherein each of said application programs includes a procedure callable using a standard format, and wherein said included procedure calls said procedure call responsive means and passes a procedure identifier, parameters, and an identification of a procedure calling convention used by said application program to said procedure call responsive means.

5. The system of claim 2:

wherein said procedure call responsive means receives a procedure identifier from the procedure call from an application program and accesses said data structure to determine the corresponding needed information.

6. The system of claim 5, wherein the needed information includes a location for the selected procedure.

7. The system of claim 5, wherein said procedure call responsive means include a plurality of procedures callable internally within said procedure call responsive means, and wherein an internally callable procedure is called when such internally callable procedure corresponds to the received procedure identifier.

8. A method in a digital computer system of processing procedure calls from an application program written in a first programming language to any selected one of a plurality of procedures, at least a first of which procedures is written in a second programming language, wherein the first programming language utilizes a first calling convention and the second programming language utilizes a second calling convention, the method comprising the steps of:

generating a procedure call from the application program, the procedure call having an expression of parameters and identifying the selected procedure and the second programming language;

providing a data structure defining a map for converting between an expression of parameters in conformance with the first calling convention and an expression of the parameters in conformance with the second calling convention; and responsive to the procedure call from the generating step, accessing the data structure and responsive thereto, converting the expression of parameters from the procedure call to a reexpression of the parameters in conformance with the second calling convention for the second programming language, and generating a procedure call including the reexpression of parameters to the selected procedure.

9. The method of claim 8, further comprising the steps of:

returning result parameters from the selected procedure using the second calling convention; and converting the result parameters to the first calling convention.

10. The method of claim 8, further comprising the steps of:

after said generating step, determining whether a selected procedure can be executed internally to the accessing step; and if the selected procedure can be so executed, executing the selected procedure internally.

* * * * *